(12) United States Patent
Gomyo et al.

(10) Patent No.: US 8,516,303 B2
(45) Date of Patent: Aug. 20, 2013

(54) ARITHMETIC DEVICE FOR CONCURRENTLY PROCESSING A PLURALITY OF THREADS

(75) Inventors: Norihito Gomyo, Kawasaki (JP); Ryuichi Sunayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 609 days.

(21) Appl. No.: 12/633,840

(22) Filed: Dec. 9, 2009

(65) Prior Publication Data
US 2010/0088544 A1 Apr. 8, 2010

Related U.S. Application Data

(63) Continuation of application No. PCT/JP2007/000661, filed on Jun. 20, 2007.

(51) Int. Cl.
*G06F 11/00* (2006.01)

(52) U.S. Cl.
USPC ............ 714/17; 714/10; 714/48; 714/49

(58) Field of Classification Search
USPC ................................ 714/10, 16, 17, 48, 49
See application file for complete search history.

(56) References Cited

U.S. PATENT DOCUMENTS

| | | | |
|---|---|---|---|
| 5,564,014 A | 10/1996 | Yamashita et al. | |
| 7,383,467 B2 | 6/2008 | Akizuki et al. | |
| 7,822,950 B1 * | 10/2010 | Fotland | 712/216 |
| 2001/0037445 A1 | 11/2001 | Mukherjee | |
| 2004/0172523 A1 * | 9/2004 | Merchant et al. | 712/228 |
| 2006/0179207 A1 * | 8/2006 | Eisen et al. | 711/100 |
| 2006/0184771 A1 * | 8/2006 | Floyd et al. | 712/218 |

FOREIGN PATENT DOCUMENTS

| | | |
|---|---|---|
| BR | 8703190 | 6/1987 |
| EP | 0 654 737 A1 | 5/1995 |
| JP | 58-154026 | 9/1983 |
| JP | 58-154047 | 9/1983 |
| JP | 63-4339 | 1/1988 |
| JP | 7-141176 | 6/1995 |
| JP | 2006-40174 | 2/2006 |

OTHER PUBLICATIONS

European Search Report dated Apr. 4, 2011 and issued in corresponding European Patent Application 07790187.4.
International Search Report for PCT/JP2007/000661, mailed Aug. 7, 2007.
Japanese Office Action issued Jul. 3, 2012 in corresponding Japanese Patent Application No. 2009-520144.

* cited by examiner

*Primary Examiner* — Joseph D Manoskey
(74) *Attorney, Agent, or Firm* — Staas & Halsey LLP

(57) ABSTRACT

A processor is provided that is capable of concurrently processing a sequence of instructions for a plurality of threads achieving the retry success rate equivalent to the success rate in processors that process a sequence of instructions for a single thread. An arithmetic device 200 is provided with an instruction execution circuit 201 for executing a plurality of threads, or an execution control circuit 202 for controlling the execution state or rerunning of the threads.

8 Claims, 8 Drawing Sheets

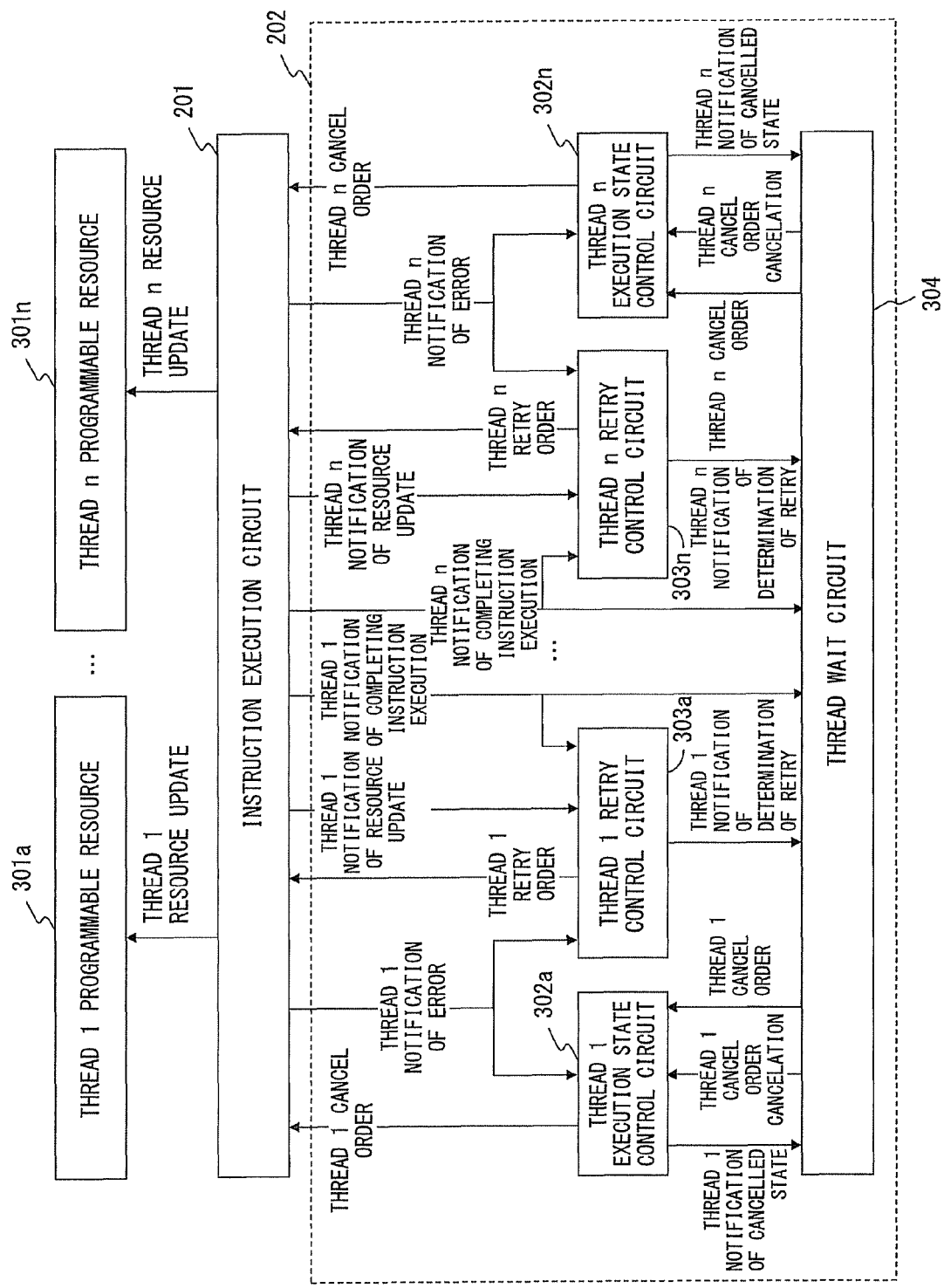
F I G. 3

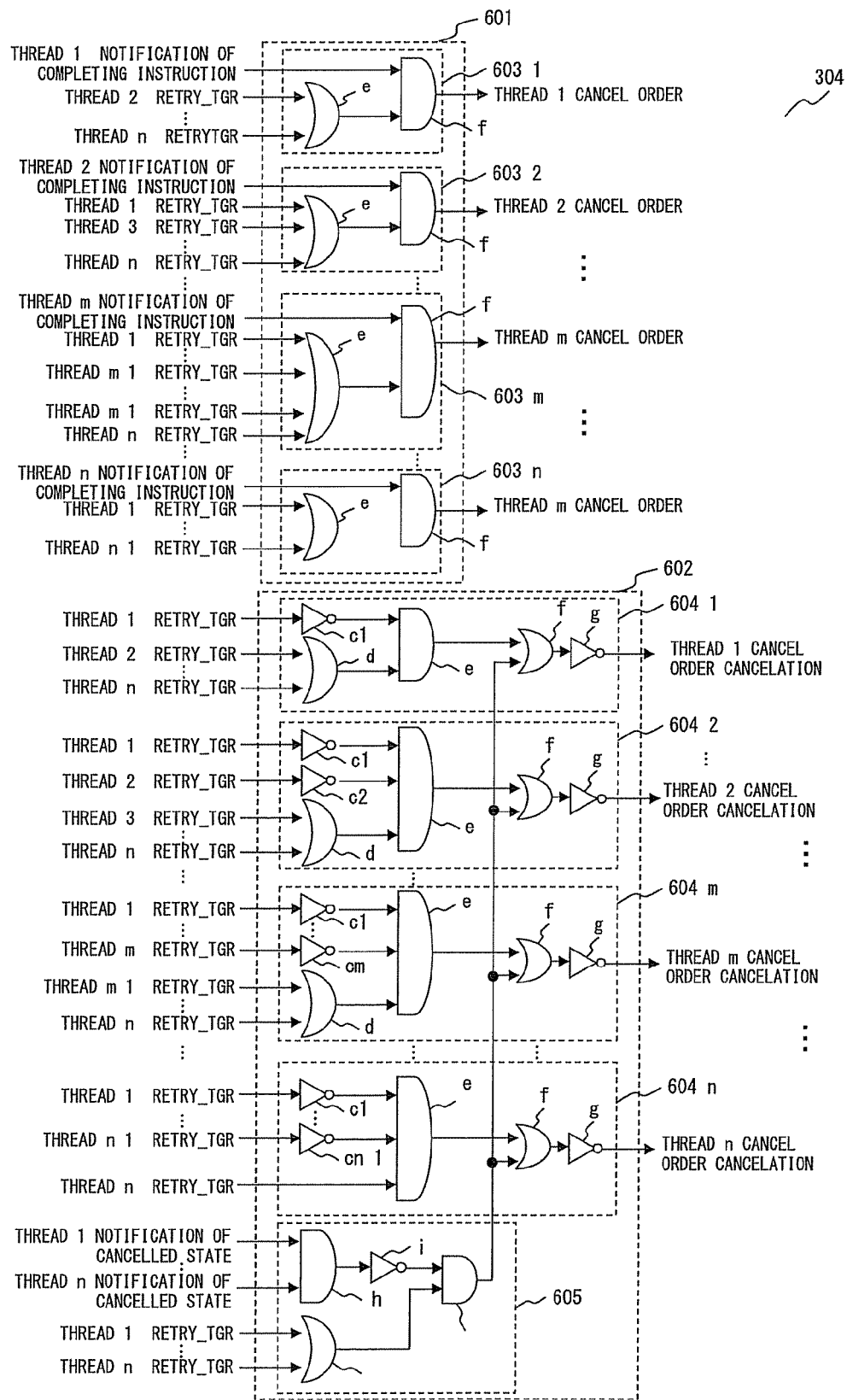
F I G. 6

ARITHMETIC DEVICE FOR CONCURRENTLY PROCESSING A PLURALITY OF THREADS

CROSS-REFERENCE TO RELATED APPLICATIONS

This application is a continuation of PCT application of PCT/JP2007/000661, which was filed on Jun. 20, 2007.

FIELD

The present invention relates to an arithmetic device that concurrently processes a plurality of threads, and that has a retry function for a hardware instruction.

BACKGROUND

In processors for servers in which reliability is important, instruction retry processing, which reruns in the hardware the instruction being processed at that time, is performed when an error is detected during the instruction processing. For example, when errors such as the following occur, the processing may continue without abnormally terminating the program by executing the instruction retry:

(1) Errors that Occur as the State of the Insides of The Hardware Temporarily Changes Due to Alpha Rays or the Like As this error is not caused by a failure of the hardware itself, the possibility is very low that the same error would occur when the instruction is rerun. Therefore, this type of error may almost certainly be recovered by performing the instruction retry.

(2) Errors that Occur Due to Noise from the Adjacent Wiring Inside the Hardware

When a signal line inside the processor is nearly damaged by electromigration or the like, an error may occur in signal lines adjacent to that signal line.

The possibility of recovering this type of error may be increased by rerunning a single instruction, as the probability of the adjacent wiring varying at the time of rerunning is greatly decreased.

FIG. 1 is a diagram illustrating a conventional instruction retry method.

A conventional arithmetic device 100 that has an instruction retry mechanism includes an instruction execution circuit 101, an execution state control circuit 102, and a retry control circuit 103, as illustrated in FIG. 1.

The instruction execution circuit 101 fetches an arbitrary instruction from a storage device, and decodes the fetched instruction. Then, the instruction execution circuit 101 performs arithmetic operation on the basis of the decoded instruction. Moreover, when executing the instruction, the instruction execution circuit 101 sequentially signals an instruction for updating a programmable resource, and checks the existence of an error in the instruction execution. Furthermore, when the instruction execution or the resource update is completed, the instruction execution circuit 101 notifies the retry control circuit 103 of that completion.

The execution state control circuit 102 orders the instruction execution circuit 101 to cancel the instruction execution. The retry control circuit 103 determines a timing at which it would be possible for the instruction execution circuit 101 to perform an instruction retry, and controls the ON/OFF of a flag (e.g., register) that indicates the determination of performing the instruction retry. Then, when determining that it is possible to perform a retry, the execution state control circuit 102 orders the instruction execution circuit 101 to execute a single instruction.

When the instruction is for updating only one resource, the instruction execution circuit 101 signals a notification of the completion of an instruction execution and a resource update at the same time. When the instruction is for updating the resource in two or more cycles, the instruction execution circuit 101 signals a notification of completing an instruction execution and a notification of completing a resource update at different times. In this case, the retry control circuit 103 determines that it is not possible to perform a retry between the time of the completion of a resource update and the time of the completion of instruction execution.

In the above configuration, retry processing is performed as in the following.

(1) When detecting an error while executing an instruction, the instruction execution circuit 101 notifies the execution state control circuit 102 and the retry control circuit 103 of the occurrence of the error.

(2) When receiving a notification of the occurrence of the error from the instruction execution circuit 101, the execution state control circuit 102 instantly orders the instruction execution circuit 101 to cancel the instruction execution in order to prevent the updating of resources from being performed using error data.

(3) When receiving a notification of the occurrence of the error from the instruction execution circuit 101, the retry control circuit 103 determines whether it is possible to perform a retry. If it is determined that it is possible to perform a retry, the retry control circuit 103 sets a flag indicating that it is possible to perform an instruction retry, and orders the instruction execution circuit 101 to rerun the instruction.

On the other hand, (4) when receiving an order cancelling the instruction execution from the execution state control circuit 102, the instruction execution circuit 101 clears all the processing in the instruction execution circuit 101. Moreover, when the order cancelling the instruction execution from the execution state control circuit 102 is negated, the instruction execution circuit 101 reruns the instruction in accordance with the order from the retry control circuit 103.

(5) When the rerunning of the instruction is completed, the instruction execution circuit 101 notifies the retry control circuit 103 of the completion of the instruction execution.

(6) When receiving a notification of completing the instruction execution from the instruction execution circuit 101, the retry control circuit 103 resets the flag that indicates that it is possible to perform the instruction retry processing, and negates the order of the rerunning to the instruction execution circuit 101.

(7) When the order of the rerunning is negated, the instruction execution circuit 101 completes the retry processing, and resumes normal instruction execution processing.

As processors in which performance is important, a processor is proposed in which the performance is improved by concurrently processing a sequence of instructions for two or more threads.

For example, processors are proposed that use a method called "fine grained vertical multi-threading" that performs a sequence of instructions for a thread different for every cycle, or a method called "simultaneous multi-threading" that performs a sequence of instructions for two or more threads at the same time. Those methods realize the concurrent processing of a sequence of instructions for two or more threads using the instruction execution circuit.

As high performance and high reliability are required in processors for servers, both high performance in processing a sequence of instructions for two or more threads at the same time and high reliability in performing retry processing upon the occurrence of an error are required.

As a method of performing retry processing in a processor that processes a sequence of instructions for two or more threads, the following two methods are possible.

(A) A method in which only one instruction retry mechanism of a processor that processes a sequence of instructions for a single thread, as in the conventional art, is provided for the processor, wherein the mechanism is common to all the threads.

(B) A method in which an instruction retry mechanism of a processor that processes a sequence of instructions for a single thread, as in the conventional art, is provided for each thread of the processor.

In method (A), however, it is not possible to perform an instruction retry if any one of the two or more threads being processed is in a state unable to perform a retry at the time of detecting the occurrence of an error. In other words, the greater the number of threads there are, the greater the possibility that it will be determined to be not possible to perform an instruction retry. Accordingly, the success rate of retries becomes lower than that of a processor for a single thread.

In method (B), an instruction retry is performed for every thread. In other words, a sequence of instructions for threads in which no error is detected is normally performed while instruction retry processing is being performed due to the detection of an error in another thread. Accordingly, in comparison to a processor that processes a single thread, there will be an increased circuit size for the circuit while processing an instruction retry. Therefore, when there is an error due to the noise from the other wiring, the success rate of retries becomes lower than that of a processor for single thread.

In relation to the technique described in the above, in Patent Document 1 an information processing device is disclosed that achieves the instruction retry function of a high quality by configuring the device such that an instruction retry is repeatedly performed and thereby verification is made.

In Patent Document 2, an information processing device is disclosed in which a command that accesses operand data two or more times is divided into commands which each access the operand data only one time, and in which when an error has occurred during the execution, only that command is rerun.

Patent Document 1: Japanese Laid-open Patent Publication No. 2006-040174

Patent Document 2: U.S. Pat. No. 5,564,014

SUMMARY

The present invention has been made in view of the above-described problems, and an object of the present invention is to provide a processor capable of concurrently processing a sequence of instructions for a plurality of threads achieving a retry success rate equivalent to the success rate in processors that process a sequence of instruction for a single thread.

In order to solve the above problems, an arithmetic device according to the present invention is provided with an instruction execution circuit to execute a plurality of threads in parallel, and to detect and notify a hardware error that occurs during the execution, and an execution control circuit to order the instruction execution circuit to cancel execution of all threads and wait until all the threads are cancelled, and to order the instruction execution circuit to rerun an error thread in which the hardware error occurred for only one instruction.

According to the present invention, the execution control circuit cancels the execution of all the threads, and waits until all the threads are cancelled. When all the threads are cancelled, the execution control circuit orders the instruction execution circuit to rerun only one instruction.

Accordingly, the other circuits excluding the circuit operated by the rerunning instruction are not operated, and thus it is possible to prevent an error due to the noise from the other circuits from occurring.

Moreover, the execution control circuit waits until all the threads are cancelled, and orders the instruction execution circuit to perform rerunning, and thus the instruction execution circuit may rerun the instructed thread without fail.

As a result, the success rate of rerunning may be improved when a hardware error occurs in the processor capable of concurrently processing a sequence of instructions for two or more threads.

As described in the above, according to the present invention, a processor capable of concurrently processing a sequence of instructions for two or more threads and achieving a retry success rate equivalent to the success rate in processors that process a sequence of instruction for a single thread may be provided.

BRIEF DESCRIPTION OF DRAWINGS

FIG. 3 is a diagram illustrating a general outline of the configuration of an arithmetic device as a whole according to the present embodiment.

FIG. 6 is a diagram illustrating a configuration example of a thread wait circuit according to the present embodiment.

DESCRIPTION OF EMBODIMENTS

Some embodiments of the present invention will be described with reference to FIG. 2 through FIG. 8.

Figure 1:
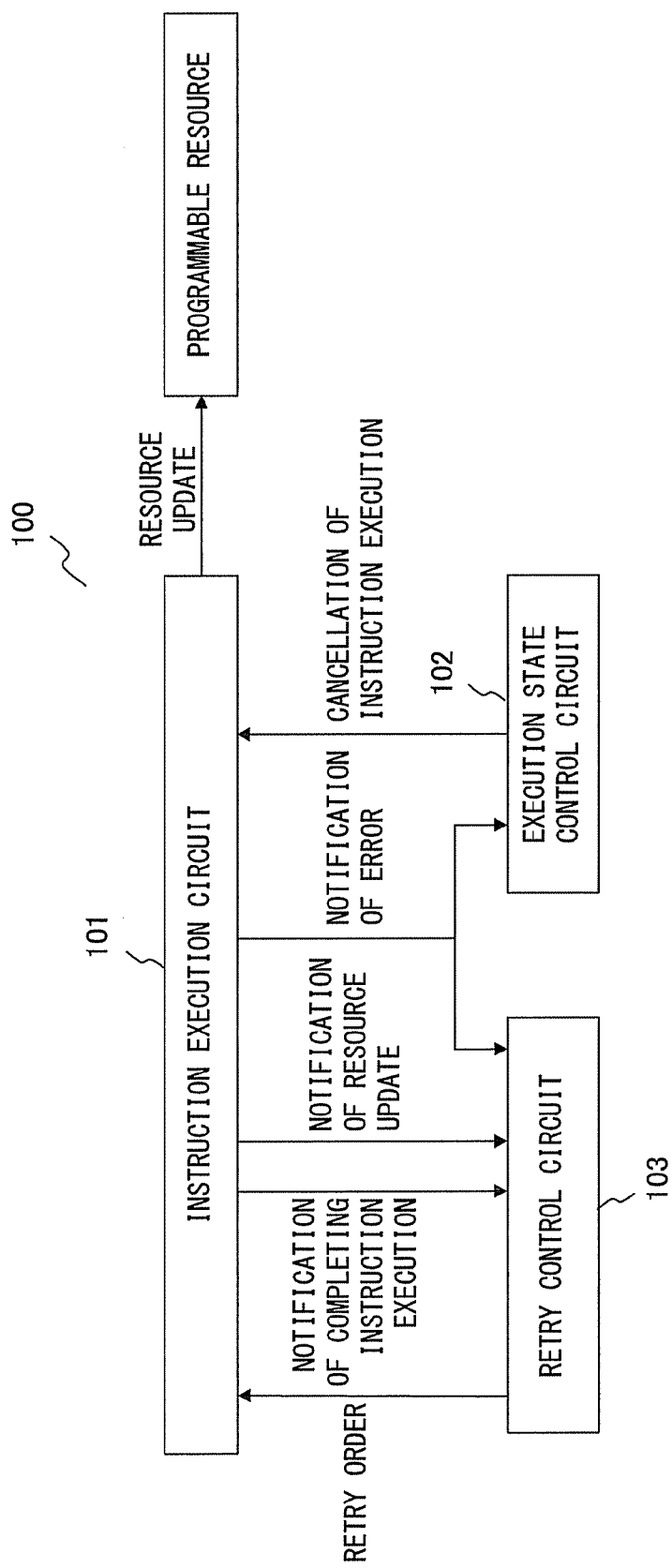
FIG. 1 is a diagram illustrating a conventional instruction retry method.
Figure 2:
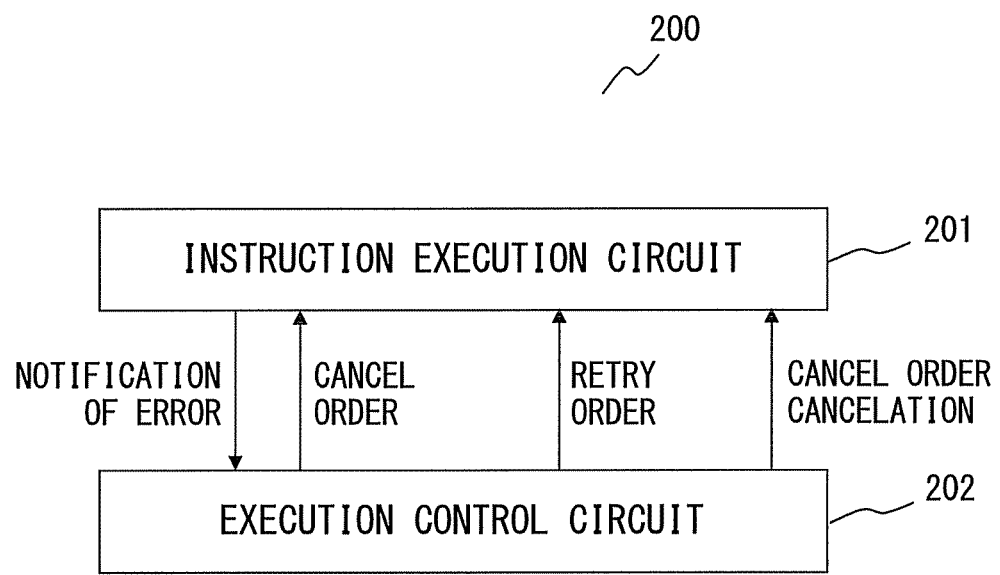
FIG. 2 is a diagram illustrating the operating principle of an arithmetic device according to the present embodiment.

FIG. 2 is a diagram illustrating the operating principle of an arithmetic device 200 according to the present embodiment.

The arithmetic device 200 of FIG. 2 includes an instruction execution circuit 201 for executing a plurality of threads, and an execution control circuit 202 for controlling the execution state or the return of the threads.

The instruction execution circuit 201 is a circuit for processing in parallel a plurality of threads including more than one sequence of instructions. For example, the instruction execution circuit 201 signals instructions such as an instruction fetch, instruction decoding, execution of an arithmetic operation, instruction completion, and programmable resource updating, to the threads, or checks for a hardware error while performing instruction execution.

Then, when detecting a hardware error while performing instruction execution for the threads, the instruction execution circuit 201 notifies the execution control circuit 202 of the hardware error (hereinafter, this notification is simply referred to as an "error notification").

Moreover, when receiving an order cancelling the execution of a specific thread from the execution control circuit 202 (hereinafter, this instruction is referred to as a "cancel order"), the instruction execution circuit 201 cancels the execution of that thread.

Furthermore, the instruction execution circuit 201 reruns the thread to which an order resetting the cancellation of execution (hereinafter, this order is referred to as a "cancel order cancellation") is signaled from an execution state control circuit 302 (not illustrated in FIG. 2) for only one instruction, where the thread comes from among the specific threads to which a rerun order is signaled from the execution control circuit 202 (hereinafter, this order is referred to as a "retry order").

When receiving an error notification from the instruction execution circuit 201, the execution control circuit 202 signals a cancel order for the thread that was being executed when a hardware error occurred (hereinafter, this thread is referred to as an "error thread"), and also signals a retry order for that error thread.

At this time, the execution control circuit 202 orders the instruction execution circuit 201 to cancel threads other than the error thread (hereinafter, these threads are referred to as "normal threads").

Then, the execution control circuit 202 monitors the execution state of the threads in the instruction execution circuit 201, and waits until the execution of all the threads is cancelled.

Once the execution of all the threads has been cancelled, the execution control circuit 202 signals a cancel order cancellation to the instruction execution circuit 201 so as to cause error threads to rerun the error threads for only one instruction. The execution control circuit 202 reruns the threads one by one, and completes the retry processing when the rerunning of all the error threads is completed.

FIG. 3 is a diagram illustrating a general outline of the configuration of an arithmetic device 200 as a whole according to the present embodiment.

As illustrated in FIG. 3, the arithmetic device 200 includes an instruction execution circuit 201 for executing a plurality of threads, an execution control circuit 202 for controlling the execution state or the rerunning of the threads, and programmable resources 301-1, 301-2, . . . , 301-n ("n" is a natural number; hereinafter, an arbitrary programmable resource is referred to as a "programmable resource 301") for executing the threads.

Furthermore, the execution control circuit 202 includes execution state control circuits 302-1, 302-2, . . . , 302-n for controlling the execution state of the threads, and retry control circuits 303-1, 303-2, . . . , 303-n for controlling the rerunning of the threads, for each of the threads, and further includes a wait circuit 304 for waiting until all the threads are cancelled in the retry execution.

One of the execution state control circuits 302-1 to 302-n, selected arbitrarily, is referred to as an "execution state control circuit 302". Similarly, one of the execution state control circuits 303-1 to 303-n, selected arbitrarily, is referred to as a "retry control circuit 303".

As described in FIG. 2, the instruction execution circuit 201 processes in parallel a plurality of threads including more than one sequence of instructions. For example, the instruction execution circuit 201 signals instructions such as an instruction fetch, instruction decoding, execution of an arithmetic operation, instruction completion, and programmable resource updating, to the threads, or checks for a hardware error while performing instruction execution.

When updating the programmable resource 301 while executing the instructions or at the time of completing the instruction execution, the instruction execution circuit 201 notifies the retry control circuit 303 that manages the threads used for the updated programmable resource 301 of the updating of the resource (hereinafter, this notification is referred to as a "resource update notification").

When completing the instruction execution of an arbitrary thread, the instruction execution circuit 201 notifies the retry control circuit 303 that manages the thread and the thread wait circuit 304 of the completion of the instruction execution (hereinafter, this notification is referred to as an "instruction completion notification").

Moreover, when detecting a hardware error while performing instruction execution, the instruction execution circuit 201 signals an error notification to the execution state control circuit 302 that manages the error thread.

Furthermore, when receiving a cancel order from the execution state control circuit 302, the instruction execution circuit 201 clears (cancels) all the instruction execution processing of the threads that are managed by that execution state control circuit 302, and terminates the updating of the programmable resource of that thread. Then, the instruction execution circuit 201 maintains this state until a cancel cancellation notification is signaled from the execution state control circuit 302.

Moreover, the instruction execution circuit 201 reruns the thread to which a cancel cancellation notification is signaled from an execution state control circuit 302 for only one instruction, where the thread is from among the threads to which a retry order is signaled from the retry control circuit 303.

When receiving an error notification from the instruction execution circuit 201 or receiving a cancel order from the thread wait circuit 304, the execution state control circuit 302 signals a cancel order to the instruction execution circuit 201.

At this time, the execution state control circuit 302 notifies the thread wait circuit 304 that the thread is in the cancelled state.

Moreover, when receiving a cancel order cancellation from the thread wait circuit 304, the execution state control circuit 302 signals a cancel order cancellation for the thread to the instruction execution circuit 201, though this is not illustrated.

When receiving an error notification from the instruction execution circuit 201, the retry control circuit 303 determines whether it is at a timing at which it would be possible to retry the thread on the basis of the instruction completion notification or resource update notification from the instruction execution circuit 201. When it is determined to be at a timing at which it would be possible to retry the thread (hereinafter, this state is referred to as a "retry determined state"), the retry control circuit 303 signals a retry order to the instruction execution circuit 201, and notifies the thread wait circuit 304 that the thread is in a retry determined state (hereinafter, this notification is referred to as a "retry determination notification").

When receiving a retry determination notification from the retry control circuit 303, the thread wait circuit 304 signals a cancel order to the execution state control circuit 302 of all the threads to which an instruction completion notification is signaled from the instruction execution circuit 201.

Then, the thread wait circuit 304 monitors the cancelled state notification from the execution state control circuit 302 that manages the threads, and waits until all the threads are cancelled.

Then, the thread wait circuit 304 selects one thread out of the threads that are in the retry determined state, and signals a cancel order cancellation to the execution state control circuit 302 that manages the thread. The execution state control circuit 302 that received the cancel order cancellation signals the cancel order cancellation to the instruction execution circuit 201 as described in the above (not illustrated in FIG. 3), and thus retry processing is performed for the thread only for one instruction (this processing is performed for all the threads that are in the retry determined state).

Then, once the retry processing of all the threads that are in the retry determined state is completed, the thread wait circuit 304 signals a cancel order cancellation to all the execution state control circuits 302, thereby completing the retry processing.

Specific configuration examples of each circuit will now be described.

Figure 4:
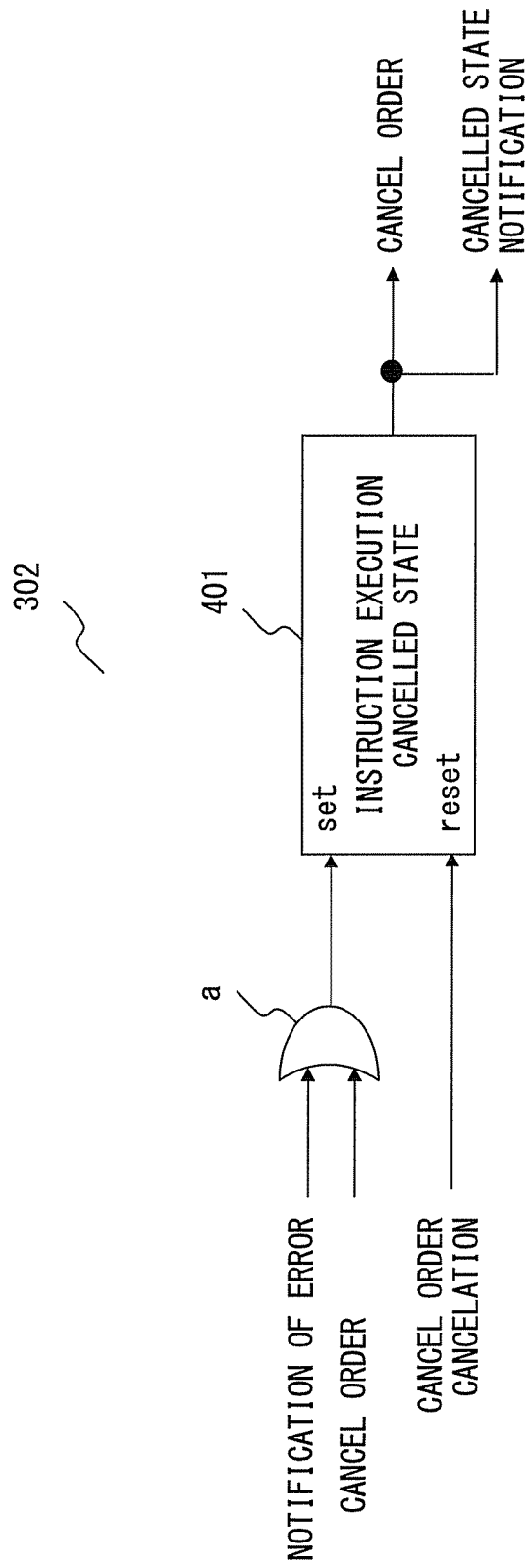
FIG. 4 is a diagram illustrating a configuration example of an execution state control circuit according to the present embodiment.

FIG. 4 is a diagram illustrating a configuration example of the execution state control circuit 302 according to the present embodiment.

The execution state control circuit 302 of FIG. 4 includes a logical sum circuit a for performing logical operation, and a register (e.g., RS-FF) 401 capable of holding/transiting the state.

The logical sum circuit a has inputs of an error notification from the instruction execution circuit 201 and a cancel order from the thread wait circuit 304. The register 401 has inputs of an output from the logical sum circuit a on a setting side, and a cancel order cancellation from the thread wait circuit 304 on a resetting side.

The logical sum circuit a outputs "1" when the error notification is "1" or the cancel order is "1", and thereby "1" is set to the register 401. Then the register 401 holds the set value. The state of the register 401 at this time is referred to as "cancelled state". Further, the cancel order cancellation becomes "1", and the register 401 is set to "0" (the cancelled state is reset).

An output of the register 401 is input into the instruction execution circuit 201 and the thread wait circuit 304. The output to the instruction execution circuit 201 is a cancel order (cancel order cancellation), and the output to the thread wait circuit 304 is a cancelled state notification.

Accordingly, when receiving an error notification from the instruction execution circuit 201 or a cancel order from the thread wait circuit 304, the execution state control circuit 302 is set to the cancelled state, and signals a cancel order to the instruction execution circuit 201 and also signals a cancelled state notification to the thread wait circuit 304. Moreover, when receiving a cancel order cancellation from the thread wait circuit 304, the execution state control circuit 302 is reset from the cancelled state, and signals a cancel order cancellation to the instruction execution circuit 201.

Figure 5:
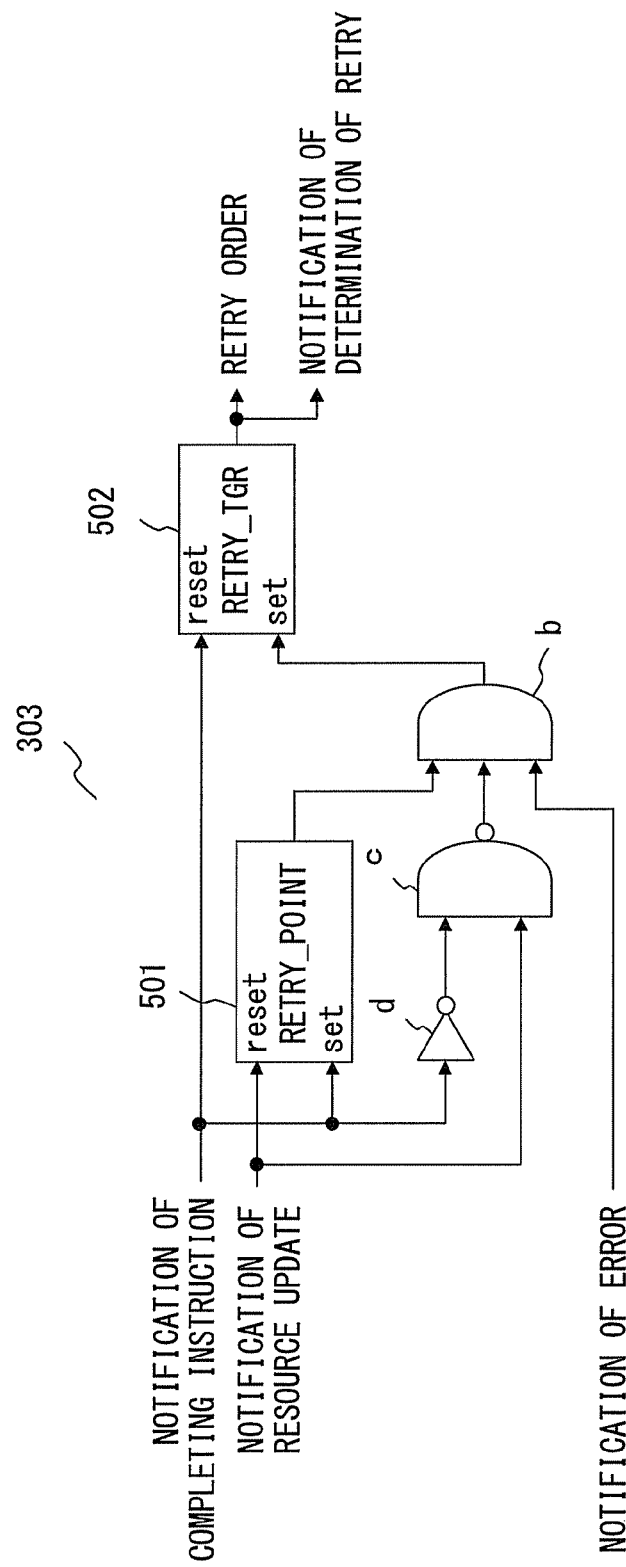
FIG. 5 is a diagram illustrating a configuration example of a retry control circuit according to the present embodiment.

FIG. 5 is a diagram illustrating a configuration example of the retry control circuit 303 according to the present embodiment.

The retry control circuit 303 of FIG. 5 includes registers (e.g., RS-FF) 501 and 502 capable of holding/transiting the state, and also logical product circuit b, non-conjunction circuit c, and negation circuit d, which perform logical operation.

The register 501 has inputs of an instruction completion notification from the instruction execution circuit 201 on a setting side, and a resource update notification from the instruction execution circuit 201 on a resetting side. Moreover, the register 502 has inputs of an output from the logical product circuit b on a setting side, and an instruction completion notification from the instruction execution circuit 201 on a resetting side. The logical product circuit b has inputs of an output from the register 501, an output from the non-conjunction circuit c, and an error notification from the instruction execution circuit 201. Furthermore, the non-conjunction circuit c has inputs of an output from the negation circuit d that has an input of an instruction completion notification from the instruction execution circuit 201, and a resource update notification from the instruction execution circuit 201.

The register 501 is set to "1" when the instruction completion notification becomes "1", and is set to "0" when the resource update notification becomes "1". Accordingly, the register 501 is reset when a resource update notification is signaled except the timing of the instruction completion, and is set when an instruction completion notification is signaled. Hereinafter, this register 501 is referred to as RETRY_POINT.

The logical product circuit b outputs "1" only when the RETRY_POINT is "1", the output of the non-conjunction circuit c is "1", and the error notification is "1".

The non-conjunction circuit c outputs "1" except when the instruction completion notification is "0" and the resource update notification is "1". Accordingly, the non-conjunction circuit c outputs "1" unless the resource update notification is input.

The register 502 is set to "1" when the output of the logical product circuit b becomes "1", and is set to "0" when the instruction completion notification becomes "1". Hereinafter, this register 502 is referred to as RETRY_TGR, and it is expressed as "retry is determined" when the RETRY_TGR is set to "1".

The output of the RETRY_TGR is input to the instruction execution circuit 201 and the thread wait circuit 304. The output to the instruction execution circuit 201 is a retry order, and the output to the thread wait circuit 304 is a retry determination notification.

As described in the above, the retry control circuit 303 determines a retry if an error notification is signaled between the recipients of the instruction completion notification and the resource update notification, and resets the retry determination if an instruction completion notification is signaled.

FIG. 6 is a diagram illustrating a configuration example of the thread wait circuit 304 according to the present embodiment.

The thread wait circuit 304 of FIG. 6 includes a cancel order unit 601 for signalling a cancel order to the execution state control circuit 302 that manages the threads, and a cancel order cancellation unit 602 for signalling a cancel order cancellation to the execution state control circuit 302 that manages the threads.

The cancel order unit 601 includes a cancel order unit 603-1 for signalling a cancel order to thread 1, a cancel order unit 603-2 for signalling a cancel order to thread 2, . . . , and a cancel order unit 603-$n$ for signalling a cancel order to thread n.

For example, the cancel order unit 603-1 includes logical sum circuit e, which has an input of the RETRY_TGR from all the threads (threads 2 to n) other than thread 1, and logical product circuit f, which has inputs of the instruction completion of thread 1 from the instruction execution circuit 201 and the output from logical sum circuit e.

The logical sum circuit e outputs "1" when the RETRY_TGR of at least more than one thread other than thread 1 becomes "1". The logical product circuit f outputs "1" when the instruction completion notification of thread 1 from the instruction execution circuit 201 is "1" and the output of the logical sum circuit e is "1".

Accordingly, the cancel order unit 603-1 outputs a cancel order for thread 1 when a retry is determined for a thread other than thread 1 and the instruction for thread 1 is completed.

Similarly, the cancel order unit 603-$m$ (m is natural number) includes logical sum circuit e, which has an input of the RETRY_TGR from all the threads (threads 1 to m−1 and thread m+1 to n) other than thread m, and logical product circuit f, which has inputs of the instruction completion of thread m from the instruction execution circuit 201 and the output from logical sum circuit e.

The logical sum circuit e outputs "1" when the RETRY_TGR of at least more than one thread other than thread m becomes "1", and the logical product circuit f outputs "1" when the instruction completion notification of thread m from the instruction execution circuit 201 is "1" and the output of the logical sum circuit e is "1".

Accordingly, the cancel order unit 603-$m$ outputs a cancel order for thread m when a retry is determined for a thread other than thread m and the instruction for thread m is completed.

The cancel order cancellation unit 602 includes a cancel order cancellation unit 604-1 for signalling a cancel order cancellation for thread 1, a cancel order cancellation unit 604-2 for signalling a cancel order cancellation for thread 2, . . . , and a cancel order cancellation unit 604-$n$ for signalling a cancel order cancellation for thread n, to the execution state control circuit 302, and a wait unit 605 for waiting until all the threads are cancelled.

The cancel order cancellation unit 604-1 includes a negation circuit c1 whose input is the RETRY_TGR of thread 1, a logical sum circuit d whose input is the RETRY_TGR of threads 2-$n$, a logical product circuit e whose inputs are the outputs of the negation circuit c1 and the logical sum circuit d, a logical sum circuit f whose inputs are the outputs of the logical product circuit e and a wait unit 605, and a negation circuit g whose input is the output of the logical sum circuit f.

The negation circuit c1 outputs "1" when the RETRY_TGR of thread 1 is "0". The logical sum circuit d outputs "1" when the RETRY_TGR of the threads other than thread 1 is "0". The logical product circuit e outputs "1" to the logical sum circuit f only when the negation circuit c1 is "1" and the logical sum circuit d is "1".

Accordingly, the cancel order cancellation unit 604-1 signals a cancel order cancellation to thread 1 when instruction retry of the threads other than thread 1 is determined and also the wait process by the wait unit 605 is completed.

Similarly, a cancel order cancellation unit 604-$m$ includes negation circuits c1, c2, . . . , cm whose input is the RETRY_TGR of thread 1, 2, . . . , m, the logical sum circuit d whose input is the RETRY_TGR of thread m+1, m+2, . . . , n, the logical product circuit e whose inputs are the outputs of the negation circuit c1, c2, . . . , cm, and the output of the logical sum circuit d, the logical sum circuit f whose inputs are the outputs of the logical product circuit e and the output of the wait unit 605, and the negation circuit g whose input is the output of the logical sum circuit f.

Each of the negation circuits c1, c2, . . . , cm outputs "1" when the RETRY_TGR of threads 1, 2, . . . , m is "0". The logical sum circuit d outputs "1" when the RETRY_TGR of threads other than the threads c1, c2, . . . , cm is "1". The logical product circuit e outputs "1" to the logical sum circuit f only when the negation circuits c1, c2, . . . , cm are "1" and also the RETRY_TGR of threads m+1, m+2, . . . , n is "1".

Accordingly, the cancel order cancellation unit 604-$m$ signals a cancel order cancellation to thread m when the instruction retry of the threads other than threads 1, 2, . . . , m is determined and also the wait process by of the wait unit 605 is completed.

The wait unit 605 includes an logical product circuit h whose input is the cancelled state notification of threads 1, 2, . . . , n from the respective execution state control circuit 302, a negation circuit i whose input is the output of the logical product circuit h, an logical sum circuit j whose input is the RETRY_TGR of threads 1, 2, . . . , n, and an logical product circuit k whose inputs are the outputs of the negation circuit i and the logical sum circuit j.

The wait unit 605 outputs "0" to the logical sum circuit f only when the RETRY_TGR of at least one or more thread out of threads 1, 2, . . . , n becomes "1" and also the cancelled state notification of all the threads becomes "1". In other cases, the wait unit 605 outputs "1" to the logical sum circuit f.

Accordingly, the wait unit 605 waits until all the threads are cancelled when there is a retry of at least one or more thread out of threads 1, 2, . . . , n. Then, when all the threads are cancelled, the wait unit 605 allows the cancel order cancellation for the threads to be signaled.

Figure 7:
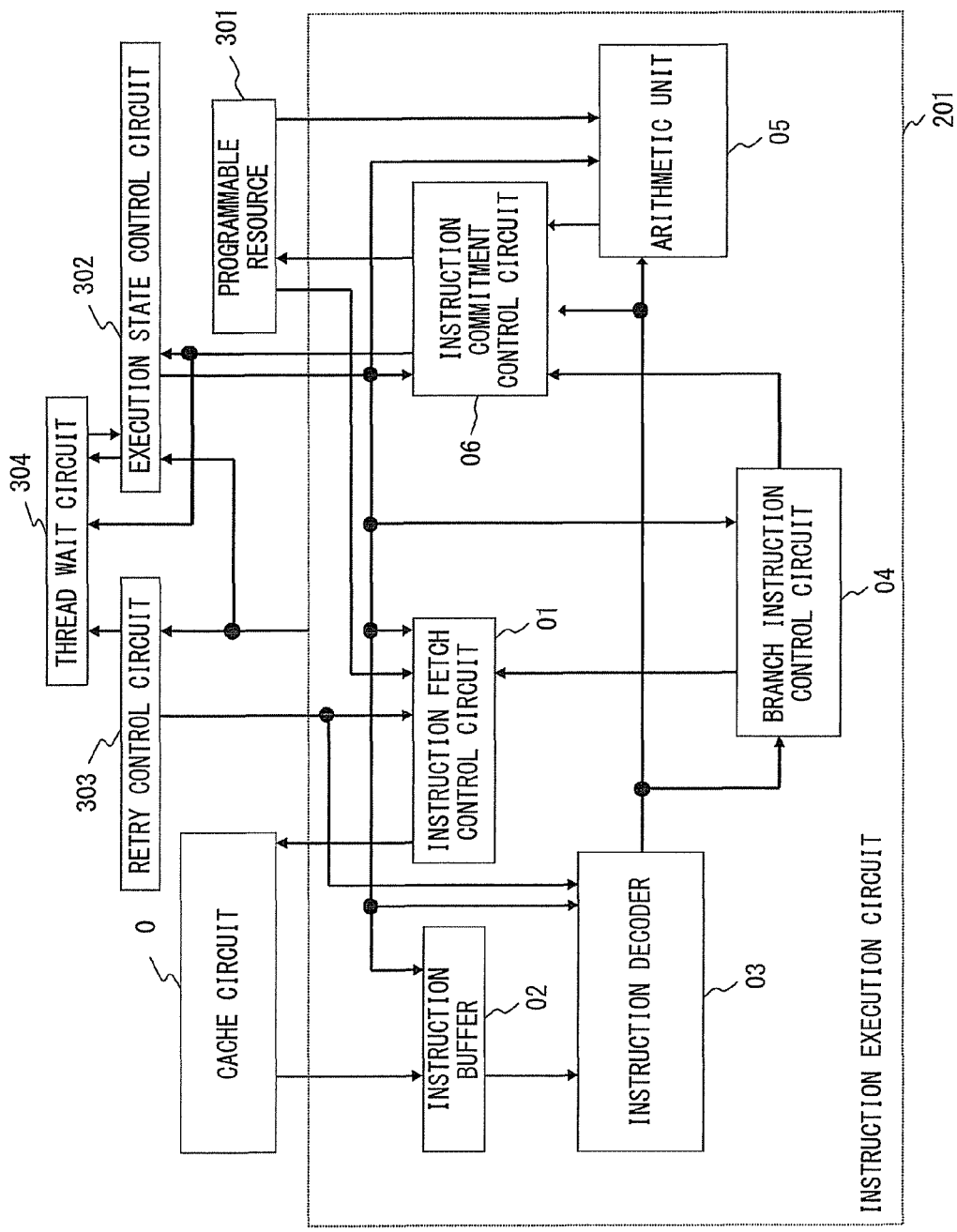
FIG. 7 is a diagram illustrating a configuration example of an instruction execution circuit according to the present embodiment.

FIG. 7 is a diagram illustrating a configuration example of the instruction execution circuit 201 according to the present embodiment.

The instruction execution circuit 201 of FIG. 7 includes an instruction fetch control circuit 701 for controlling fetch processing of a sequence of instructions for the threads, an instruction buffer 702 for temporarily storing the fetched sequence of instructions, an instruction decoder 703 for decoding the sequence of instructions, a branch instruction control circuit 704 for, for example, computing the branch address of a branch instruction, an arithmetic unit 705 for performing an arithmetic operation in accordance with the instruction, and an instruction commitment control circuit 706 for ordering updating of the programmable resource by completing the instructions in the order of the sequence of instructions.

The instruction fetch control circuit 701 orders a cache circuit 707 to fetch a sequence of instructions for each thread, and stores the fetched sequence of instructions in the instruction buffer 702. Moreover, when a retry order is signaled from the retry control circuit 303 and also the cancelled state is reset by a cancel order cancellation from the execution state control circuit 302, the instruction fetch control circuit 701 orders the cache circuit 707 to fetch the sequence of instructions for the thread.

The instruction decoder 703 fetches and decodes a sequence of instructions for each thread from the instruction buffer 702, and issues an instruction to the branch control circuit 704, the arithmetic unit 705, the instruction commitment control circuit 706, or the like, in accordance with a result of decoding. Moreover, when a retry order is received from the retry control circuit 303 and also the cancelled state is cancelled by a cancel order cancellation from the execution state control circuit 302, the instruction decoder 703 fetches an instruction from the instruction buffer 702 and reruns the fetched instruction for only one instruction.

The branch control circuit 704 performs branch instruction processing such as computing of a branch address or determination of a branch direction of the branch instruction for a plurality of threads, and subsequently notifies the instruction commitment control circuit 706 of the completion of branch instruction processing.

The arithmetic unit 705 performs arithmetic operation in accordance with the instruction for the threads, and notifies the instruction commitment control circuit 706 of the completion of the arithmetic operation.

When completing all the processing necessary for the instruction after receiving a completion notification of the processing from the branch control circuit 704 or the arithmetic unit 705, the instruction commitment control circuit 706 completes the instruction in the order of the sequence of instructions. Then, the instruction commitment control circuit 706 notifies the retry control circuit 303 and the thread wait circuit 304 of the instruction completion. Furthermore, the instruction commitment control circuit 706 signals an instruction of updating the programmable resource as necessary, and notifies the retry control circuit 303 of the resource update.

The circuits in the above-described instruction execution circuit 201 are provided with an error detection circuit for detecting a hardware error (not illustrated in FIG. 7). Then, when detecting a hardware error while executing an instruction, the error detection circuit signals an error notification to the execution state control circuit 302 and the retry control circuit 303 that manage an error thread.

When receiving a cancel order from the execution state control circuit 302, the respective circuits of the instruction fetch control circuit 701, the instruction buffer 702, the instruction decoder 703, the branch instruction control circuit 704, the arithmetic unit 705, and the instruction commitment control circuit 706 stop the processing of the thread that is managed by that execution state control circuit 302, and thereby clear the state (i.e., the thread is cancelled).

Furthermore, when receiving a retry order from the retry control circuit 303 and receiving a cancel order cancellation from the execution state control circuit 302 as described in the above, the instruction execution circuit 201 performs the retry processing of the thread that is managed by the execution state control circuit 302 and the retry control circuit 303. Description in detail of the processing in which execution is performed only for one instruction is omitted as the functions generally provided for arithmetic devices may be used.

Figure 8:
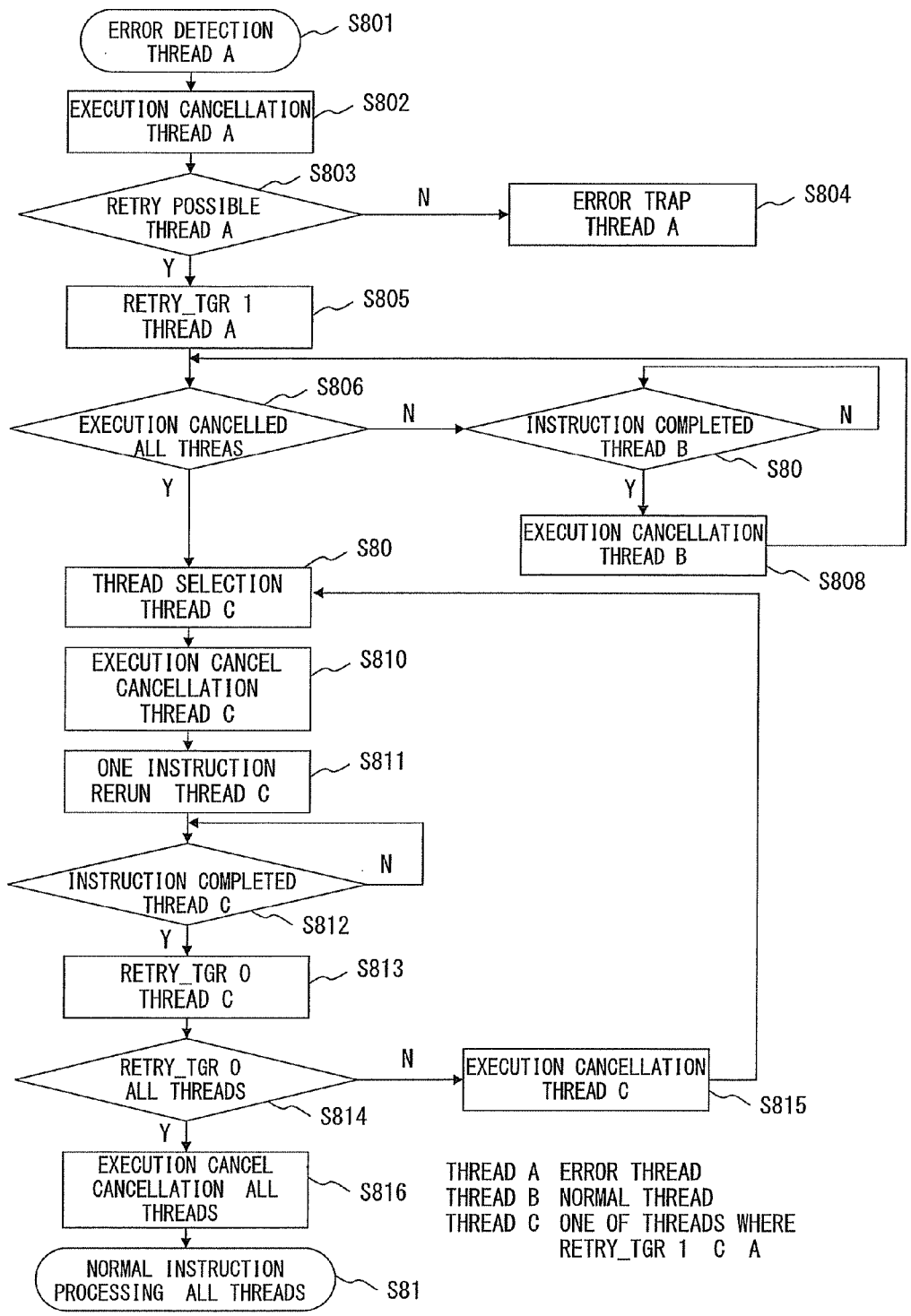
FIG. 8 is a flowchart illustrating the operation of an arithmetic device according to the present embodiment.

FIG. 8 is a flowchart illustrating the operation of the arithmetic device 200 according to the present embodiment.

In step S801, when detecting a hardware error while instruction execution of the threads is being performed, the instruction execution circuit 201 signals an error notification to the execution state control circuit 302 and the retry control circuit 303 that manage an error thread.

In step S802, the execution state control circuit 302 to which an error notification is signaled signals to the instruction execution circuit 201 a cancel order of the instruction execution of the thread that is managed on its own.

In step S803, the retry control circuit 303 to which an error notification is signaled determines whether or not it is possible to perform the retry of the thread that is managed on its own. When it is determined that it is not possible to perform the retry, the retry control circuit 303 shifts the processing to step S804.

In step S804, the arithmetic device 200 sets an error trapping, and executes processing such as error processing (e.g., interrupt handler) by using software that is being executed.

In step S803, when it is determined to be possible to perform the retry, the retry control circuit 303 shifts the processing to step S805.

In step S805, the retry control circuit 303 sets "1" to the RETRY_TGR so as to set the retry to be in the determined state.

In step S806, the thread wait circuit 304 determines whether or not the threads are cancelled. When there are some threads that are not cancelled, the thread wait circuit 304 shifts the processing to step S807.

In step S807, the thread wait circuit 304 determines whether or not the instruction execution of the normal threads that are not cancelled is completed. Unless the instruction execution is completed, the processing of step S807 is recursively executed.

In step 807, when receiving an instruction completion notification from the normal threads that are not cancelled, the thread wait circuit 304 shifts the processing to step S808. In step S808, the thread wait circuit 304 orders the execution state control circuit 302 to cancel the instruction execution of the thread. Then, the thread wait circuit 304 shifts the processing to step S806.

In steps S806-S808 described above, the thread wait circuit 304 waits until all the threads are cancelled.

In step S806, when the instruction execution of all the threads is cancelled, the thread wait circuit 304 shifts the processing to step S809.

In step S809, the thread wait circuit 304 selects one thread out of the threads in which "1" is set to the RETRY_TGR in the processing of step S805. Hereinafter, the selected thread is referred to as a "selection thread".

In step S810, the thread wait circuit 304 signals a cancel order cancellation to the execution state control circuit 302 that manages a selection thread.

In step S811, when the cancellation of the selection thread is reset, the instruction execution circuit 201 reruns the selection thread for only one instruction. Then, the instruction execution circuit 201 shifts the processing to step S812.

In step S812, the retry control circuit 303 determines whether or not the rerunning is completed. For example, the retry control circuit 303 detects an instruction completion notification of the selection thread transmitted from the instruction execution circuit 201.

When the instruction completion notification is not detected, the retry control circuit 303 recursively executes the processing of step S812.

In step S812, when the instruction completion notification is detected, the retry control circuit 303 determines that the rerunning is completed and thereby shifts the processing to step S813.

In step S813, the retry control circuit 303 resets the RETRY_TGR set in step S805 to "0" to cancel the determined state of the retry.

In step S814, the thread wait circuit 304 determines whether or not the rerun processing of S809-S813 is completed for all the threads in which the instruction retry is set to be in the determined state in step S805.

When threads that are not rerun exist, the thread wait circuit 304 shifts the processing to step S815 and orders the execution state control circuit 302 to cancel the instruction execution of the selection thread. Then, the thread wait circuit 304 performs the processing of steps S809-S814.

In step S814, when it is determined that the rerun processing of S809-S813 is completed for all the threads in which the retry is determined in step S805, the thread wait circuit 304 shifts the processing to step S816.

In step S816, the thread wait circuit 304 orders all the execution state control circuits 302 to reset the cancellation of the threads. Then, the thread wait circuit 304 shifts the processing to step S817.

In step S817, the instruction execution circuit 201 starts the normal processing for all the threads.

As described in the above, when a hardware error occurs while the instruction execution is being performed in the instruction execution circuit 201, the arithmetic device 200 cancels the execution of all the threads. Then, the arithmetic device 200 waits until all the threads are cancelled. Then, when all the threads are cancelled, the arithmetic device 200 reruns the error thread for only one instruction.

As the arithmetic device 200 reruns one error thread with all the threads cancelled, the arithmetic device 200 may, for example, avoid a hardware error due to the noise from the other wiring.

Moreover, the arithmetic device 200 performs the rerunning after waiting until all the threads are cancelled, and thus may rerun the error thread without fail.

As a result, a high retry success rate may be achieved. Moreover, as the retry success rate becomes high, the reliability of the arithmetic device 200 may be improved.

Furthermore, as the size of circuits that operate during the retry processing may be reduced, the arithmetic device 200 may successfully perform the retry in a similar way as a processor that processes a sequence of instructions for a single thread even if the processor concurrently processes a sequence of instructions for a plurality of threads.

What is claimed is:

1. An arithmetic device, comprising:
an instruction execution circuit that executes a plurality of threads, and that detects and notifies a hardware error that occurs during the execution; and
an execution control circuit, once it is notified of the hardware error by the instruction execution circuit, that orders the instruction execution circuit to cancel execution of all threads and wait until all the threads are cancelled, and that orders the instruction execution circuit to rerun an error thread in which the hardware error occurred for only one instruction.

2. The arithmetic device according to claim 1, wherein
the execution control circuit comprises for each of the threads:
an execution state control circuit that orders the instruction execution circuit to cancel execution of the thread so as to control an execution state of the thread; and
a retry control circuit that detects a timing at which it would be possible to rerun the one instruction using an execution state of the error thread in the instruction execution circuit, and that orders the instruction execution circuit to rerun the one instruction.

3. The arithmetic device according to claim 2, wherein
the execution control circuit comprises
a thread wait circuit that monitors an execution state of the thread until all the threads are cancelled, and that orders the retry control circuit to let the instruction execution circuit rerun the one instruction when an execution state of all the threads is cancelled.

4. The arithmetic device according to claim 3, wherein
the thread wait circuit orders the execution state control circuit to cancel execution of a normal thread other than the error thread when the execution state control circuit orders the instruction execution circuit to cancel the error thread in response to a notification of the hardware error.

5. The arithmetic device according to claim 2, wherein
the retry control circuit determines a timing at which it would be possible to rerun the one instruction using a time of being notified by the instruction execution circuit of completion of execution of the error thread.

6. The arithmetic device according to claim 1, wherein
the execution control circuit comprises for each of the threads:
an execution state control circuit that orders the instruction execution circuit to cancel execution of the thread so as to control an execution state of the thread; and
a retry control circuit that detects a timing at which it would be possible to rerun the one instruction from an execution state of the error thread in the instruction execution circuit, and that orders the instruction execution circuit to rerun the one instruction, and
the execution control circuit further comprises
a thread wait circuit that orders a second execution state control circuit other than a first execution state control circuit to cancel execution of the thread when receiving a notification indicating that the first execution state control circuit of which the hardware error is notified instructed the instruction execution circuit to cancel execution of the error thread, that monitors an execution state of the thread until all threads are cancelled, and that orders the retry control circuit to let the instruction execution circuit rerun the one instruction when an execution state of all the threads is cancelled.

7. An instruction retry method for ordering an arithmetic device to perform an instruction retry processing, the instruction retry method comprising:
executing a plurality of threads, and detecting a hardware error that occurs during the execution;
ordering an instruction execution circuit that performs the instruction execution processing to cancel execution of all threads and waiting until all the threads are cancelled, and ordering the instruction execution circuit to rerun an error thread in which the hardware error occurred for only one instruction; and
rerunning the error thread in which the hardware error occurred only for one instruction in response to the retry order.

8. The instruction retry method according to claim 7, wherein
the ordering to the instruction execution circuit comprises:
ordering the instruction execution circuit to cancel execution of the error thread and to cancel execution of each normal thread other than the error thread;
waiting until the error thread and the normal thread are all cancelled in the instruction execution circuit; and
detecting a timing at which it would be possible to rerun the one instruction from an execution state of the error thread in the instruction execution circuit, and ordering the instruction execution circuit to rerun the one instruction.

* * * * *